(12) United States Patent
Smith et al.

(10) Patent No.: US 6,405,044 B1
(45) Date of Patent: Jun. 11, 2002

(54) CELLULAR COMMUNICATIONS SYSTEM

(75) Inventors: Martin Stevens Smith, Chelmsford; Andrew William Jeffries, Saffron Walden, both of (GB)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/385,940

(22) Filed: Aug. 30, 1999

(30) Foreign Application Priority Data

Dec. 21, 1998 (GB) .............................................. 9828209

(51) Int. Cl.[7] ................................................ H04Q 7/20
(52) U.S. Cl. ...................... 455/447; 455/67.3; 455/450; 370/329
(58) Field of Search .......................... 455/422, 63, 429, 455/446–453, 561, 562, 443, 444, 456, 464, 501, 67.3; 370/329–338

(56) References Cited

U.S. PATENT DOCUMENTS

| | | | | |
|---|---|---|---|---|
| 5,365,571 A | * | 11/1994 | Rha et al. ...................... 379/59 |
| 5,596,570 A | * | 1/1997 | Soliman ...................... 370/252 |
| 5,740,536 A | * | 4/1998 | Beneveniste ................ 455/447 |
| 5,787,352 A | * | 7/1998 | Beneveniste ................ 455/452 |
| 6,035,219 A | * | 3/2000 | Brodie ......................... 455/562 |
| 6,078,814 A | * | 6/2000 | Jeffries et al. ............... 455/447 |
| 6,128,498 A | * | 10/2000 | Beneveniste ................ 455/450 |
| 6,181,918 B1 | * | 1/2001 | Beneveniste .................. 455/63 |
| 6,259,922 B1 | * | 7/2001 | Beneveniste ................ 455/452 |

* cited by examiner

Primary Examiner—Edward F. Urban
Assistant Examiner—Charles Craver
(74) Attorney, Agent, or Firm—Lee, Mann, Smith, McWilliams, Sweeney & Ohlson

(57) ABSTRACT

The invention relates particularly to fixed wireless access networks and provides a cellular communication network which serves directional subscribers while reducing co-frequency interference substantially uniformly across the network. The network comprises a plurality of base stations arranged to form sectored cells using a plurality of carrier frequencies, where sectors carrying common frequencies are directionally mis-aligned and arranged such that the polarization of said frequencies are varied with respect to each other across the network in order to reduce co-frequency interference.

10 Claims, 4 Drawing Sheets

| 1H | 2H | 2H | 3H | 1V | 2V | 2V | 3V |
|----|----|----|----|----|----|----|----|
| 4H | 3H | 1H | 4H | 4V | 3V | 1V | 4V |
|    |    | F  |    |    |    | G  |    |
| 4H | 1H | 3H | 4H | 4V | 1V | 3V | 4V |
| 3H | 2H | 2H | 1H | 3V | 2V | 2V | 1V |
| 1V | 2V | 2V | 3V | 1H | 2H | 2H | 3H |
| 4V | 3V | 1V | 4V | 4H | 3H | 1H | 4H |
|    |    | E  |    |    |    | H  |    |
| 4V | 1V | 3V | 4V | 4H | 1H | 3H | 4H |
| 3V | 2V | 2V | 1V | 3H | 2H | 2H | 1H |

*Fig. 3*

CELLULAR COMMUNICATIONS SYSTEM

FIELD OF THE INVENTION

This invention relates to cellular communications networks and is particularly but not exclusively related to fixed wireless access (FWA) applications.

BACKGROUND OF THE INVENTION

Cellular communications networks are well known for both mobile and fixed subscribers. In cellular networks the coverage area is divided into cells, each cell is served by a base station or base site which allocates a frequency or group of frequencies which define communication channels between the subscriber and base station. The number of frequencies available to a cellular network is limited; so that the frequencies are re-used over different cells to make maximum use of these frequencies while at the same time maintaining an acceptable level of interference between neighbouring cells operating on the same frequency. One of the known methods for reducing interference is to divide each cell or base station into sectors, each sector being allocated a particular frequency or group of frequencies. In some conventional mobile subscriber sectored networks, frequencies are allocated such that the same frequency is given to corresponding similarly aligned sectors in each base site. While this reduces the level of a frequency interference from adjacent (first tier) cells, inference still occurs with cells beyond the adjacent cell—second, third tier and so on interference. Such arrangements are a particular problem in FWA networks where subscribers have high gain narrow beamed directional antennas, because the directional antenna is still aligned with co-frequency sectors in adjacent (first tier) and more distant (second, third . . . tier) cells.

There have been attempts to reduce co-frequency interference by varying the direction of sectors in some cells with respect to other cells such that sectors having the same frequency or frequency group are mis-aligned. By rotation of some cell sectors with respect to other cell sectors, direct co-frequency interference from first tier cells can be reduced.

It has also been known to change the polarisation of two adjacent co-channel sectors on an ad hoc basis to overcome severe and localised cases of co-channel interference.

Another method of reducing interference is to increase the number of frequencies or frequency groups allocated to each cell by increasing the number of sectors. In this way each sector is narrower and will therefore be less exposed to co-frequency sectors of adjacent cells, and for directional subscribers with suitable sector rotation the cell distance between direct interfering sectors can be increased. The number of frequencies or frequency groups allocated to each cell is known as the frequency reuse factor N which is a product of the base re-use factor $N_b$ and the sector re-use $N_s$. The frequency re-use factor in GSM type mobile systems is typically 12–48. Generally the higher the frequency re-use factor N, the lower the co-frequency interference and hence the better the carrier to interference ratio (C/I). However the high frequency re-use factors typical in mobile systems reduces the capacity of the system in that less frequencies are available per base.

Most prior art systems are concerned with serving subscribers who are equipped with omnidirectional antennas such as mobile phones, which receive signals equally from all directions. The allocation of frequencies to base stations in these systems is therefore typically restricted to prevent strong unwanted interfering signals from first tier cells.

SUMMARY OF THE INVENTION

It is an object of the present invention to minimise co-frequency interference across a cellular communications network which serves directional subscribers.

In a first aspect the present invention provides a method of operating a cellular communications network which serves directional subscribers, the method comprising:

maintaining sectored cells in order to communicate wanted signals between a plurality of subscribers and base stations using a plurality of carrier frequencies;

maintaining directional mis-alignment and polarisation differences across the network between sectors carrying common frequencies in order to reduce co-frequency interference.

Preferably directional mis-alignment is maintained between sectors in first tier cells carrying common frequencies in order to reduce first tier co-frequency interference; and polarisation differences are maintained between sectors in second and higher tier cells carrying common frequencies in order to reduce second and higher tier co-frequency interference.

Alternatively, polarisation differences between co-frequency sectors can be maintained to reduce first tier interference and mis-alignment between co-frequency sectors can be maintained to reduce second tier interference. As a further alternative, sector mis-alignment can be used to reduce interference from all tiers with polarisation differences being used to reduce significant interferors.

Preferably the method comprises the further step of:

maintaining the cells in tessellating clusters such that co-frequency interference is reduced substantially uniformly across the network.

Preferably each said tessellating cluster comprises a number of repeating sector frequency patterns overlaid with a number of sector polarisation patterns.

Preferably each said tessellating cluster comprises:

a first sector frequency pattern comprising a number of cells and n repeated sector frequency patterns, wherein n is the number of sectors in each cell;

and wherein for each repeated sector frequency pattern, frequencies in sectors having subscribers directed towards base stations in said first sector frequency pattern are orthogonally polarised with respect to corresponding sectors in said first pattern.

Preferably said orthogonal polarisation difference is vertical and horizontal polarisation.

In a second aspect the present invention provides a cellular communications network which serves directional subscribers and comprises:

a plurality of base stations arranged to form sectored cells using a plurality of carrier frequencies;

wherein sectors carrying common frequencies are directionally mis-aligned and arranged such that the polarisation of said frequencies are varied with respect to each other across the network in order to reduce co-frequency interference.

Preferably sectors in first tier cells carrying common frequencies are directionally misaligned in order to reduce first tier co-frequency interference, and sectors in second and higher tier cells carrying common frequencies are arranged such that the polarisation of said frequencies are varied with respect to each other in order to reduce second and higher tier co-frequency interference.

Preferably the cells are arranged into tessellating clusters such that co-frequency interference is reduced substantially uniformly across the network.

Preferably each said tessellating cluster comprises a number of repeating sector frequency patterns overlaid with a number of sector polarisation patterns.

Preferably each said tessellating cluster comprises:
a first sector frequency pattern comprising a number of cells and n repeated sector frequency patterns, wherein n is the number of sectors in each cell;
and wherein for each repeated sector frequency pattern, frequencies in sectors having subscribers directed towards base stations in said first sector frequency pattern are orthogonally polarised with respect to corresponding sectors in said first pattern.

Preferably said orthogonal polarisation difference is vertical and horizontal polarisation.

BRIEF DESCRIPTION OF THE DRAWINGS

The invention will now be described in more detail with reference to the accompanying drawings, by way of example only and without intending to be limiting, in which:

FIG. 3 is a schematic diagram of a quad-sectored cellular network in accordance with a second embodiment of the invention;

FIG. 5 is a schematic diagram of a number of joined first embodiment tri-sectored cellular networks.

DETAILED DESCRIPTION OF PREFERRED EMBODIMENTS

The invention provides for a cellular network to be arranged such that cells are grouped into clusters which permit tessellation, in that the pattern of frequencies or groups of frequencies and polarisation within a cluster repeats over the remaining clusters of cells in the network.

Preferably the sectored base sites are centrally located within a cell to serve radially extending cell sectors (centre-excitation); although base station sites located at the edges of the cells (edge-excitation) could also be used.

Figure 1:
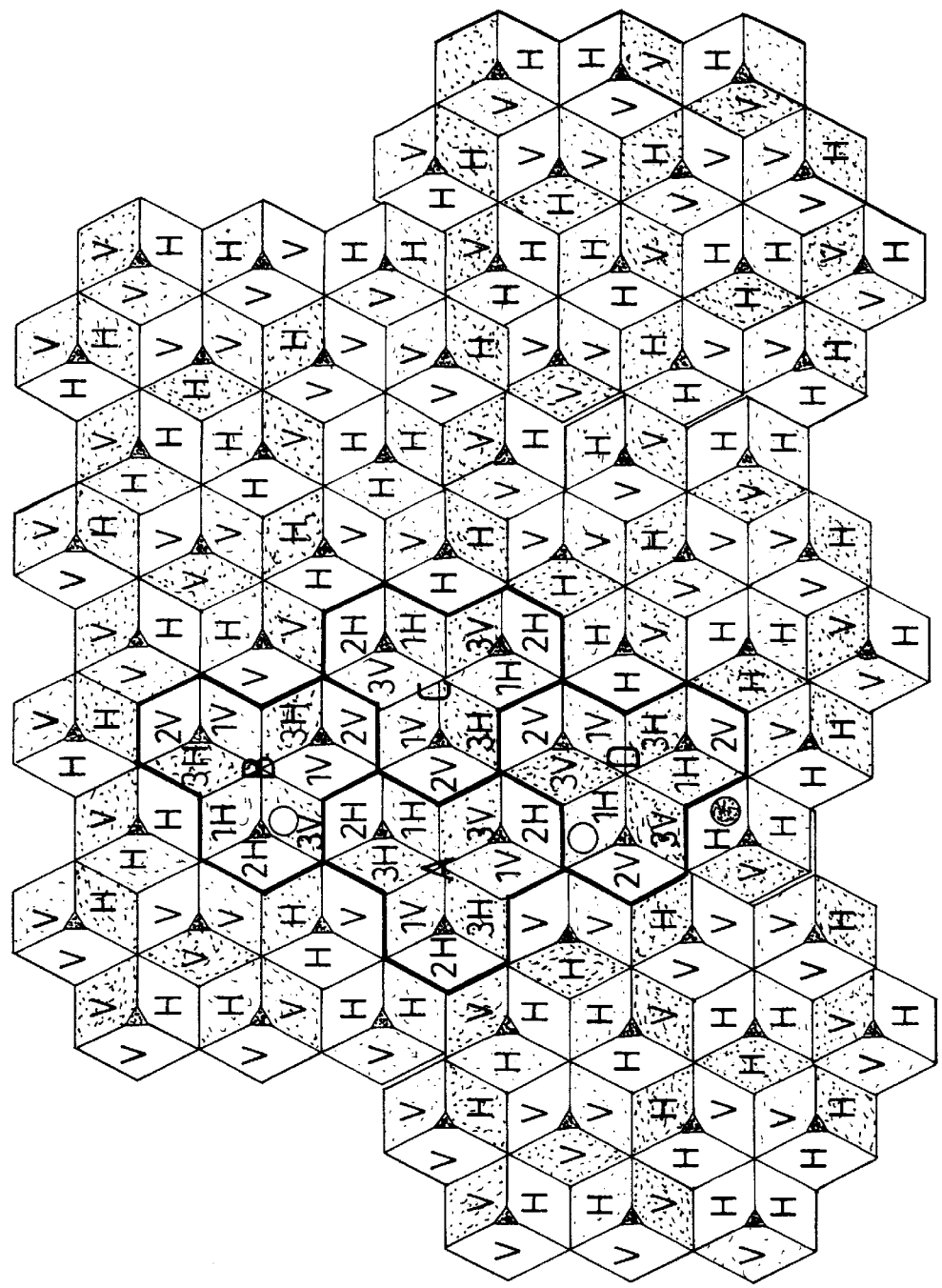
FIG. 1 is a schematic diagram of a tri-sectored cellular network in accordance with a first embodiment of the invention.

Referring to FIG. 1, there is shown a cellular network arrangement in accordance with a first embodiment of the invention. The cells are tri-sectored with a base re-use factor $N_b$ of such that three frequencies or groups of frequencies (referenced as 1, 2, and 3) are used across the network, one allocated to each sector of a cell. Other base re-use factors $N_b$ could alter natively be used, the same set of frequencies being allocated to sectors within cells with the same base re-use number. Cells with a different base re-use number will have sectors allocated with a different set of three frequencies in the case of tri-sectored cells. As a further alternative, the base re-use factor $N_b$ can be a non-integer with cells having different frequency assignments.

Figure 2:
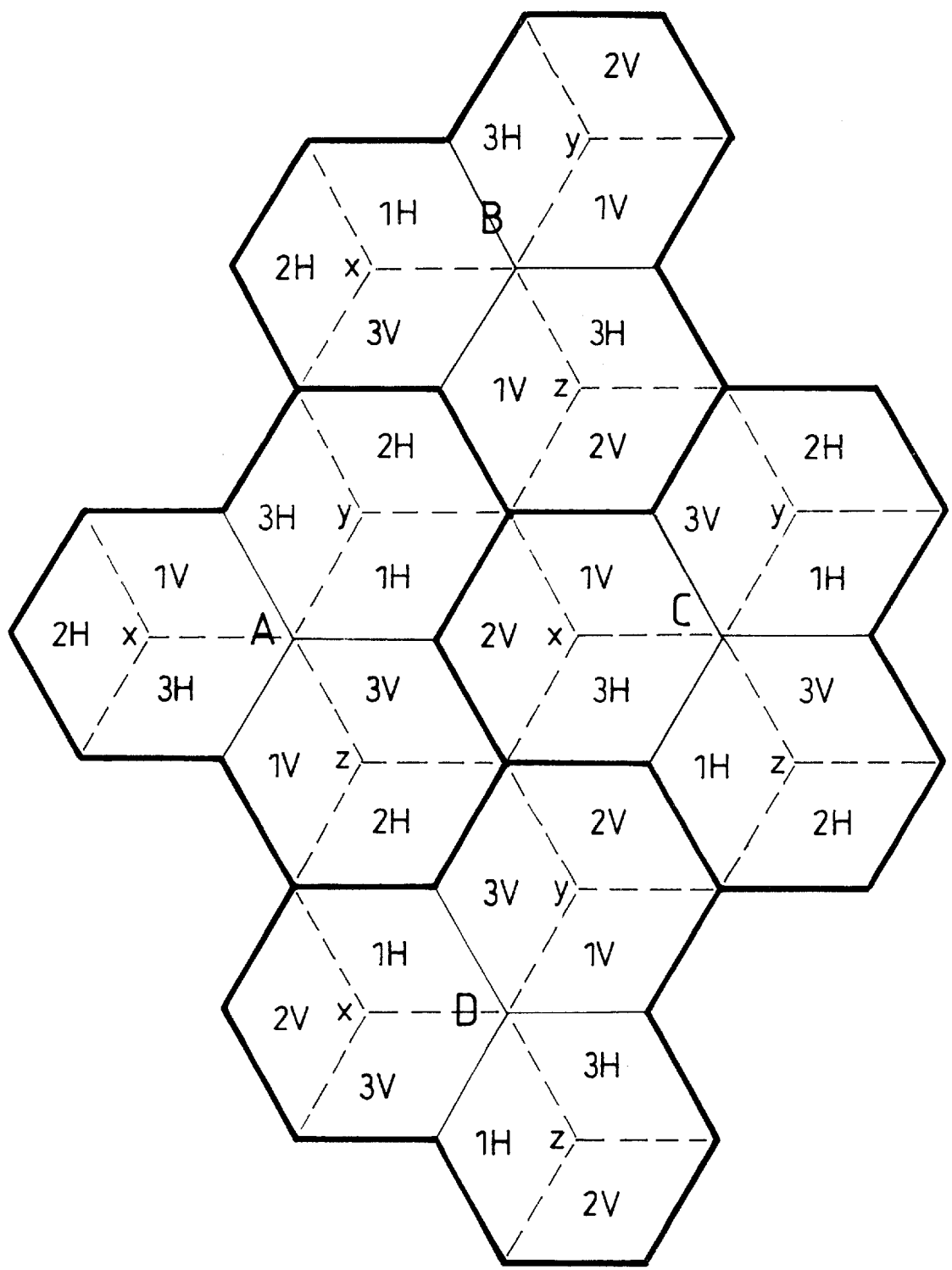
FIG. 2 is a detail showing the tessellating cluster of cells for the network of FIG. 1.

FIG. 2 shows the tessellating cluster of cells which repeats across the network of FIG. 1. The tessellating cluster is arranged into repeating sector frequency patterns A, B, C and D each comprising 3 cells x, y and z. In the basic sector frequency pattern A or B or C or D, first tier co-frequency interference is reduced across the network by frequency assignment rotation within each frequency pattern. The sector frequency allocation shown has been achieved within each frequency pattern (A, B, C and D) by frequency assignment rotation of cells y and z with respect to cell x, the common base line frequency assignment which is maintained in one cell x of each sector frequency pattern A, B, C or D. Referring to frequency pattern A, cell y has been rotated clockwise by 120°, and cell z has been rotated anti-clockwise by 120° with respect to cell x. This sector frequency assignment in frequency pattern A is repeated across the tessellating cluster in the other frequency patterns (B, C and D).

It can be seen from this that in the directional subscriber environment of an FWA network, there is no first tier co-frequency interference. For example, looking at frequency pattern A cell z (cell Az), a subscriber in sector 2 will have an antenna directed to the cell Az central base station so that it will not "see" sector 2 in first tier cells Ay, Ax, Cx, Dy or Dx with the same frequency allocation—that is first tier co-channel interference has been eliminated by the above described frequency assignment rotation. Similarly the base station of Ay, Ax, Cx, Dy, or Dx will not "see" a subscriber in sector 2 of cell Az. With the frequency patterns A, B, C and D of the tessellating cluster of FIG. 2 applied to the network of FIG. 1, it can be seen that there is no first tier co-channel interference between subscribers in one cell and first tier base station sectors utilising the same frequency or group of frequencies.

This would not be the case in a standard mobile cellular communications network in which mobile antennas are omnidirectional. In this case a subscriber in sector 2 of cell Az for example would "see" the relatively close sector 2 coverage in cell Dx which would result in significant first tier interference. This type of frequency assignment would therefore not be suitable for an omnidirectional mobile subscriber network. It may be feasible however in some mobile subscriber arrangements to incorporate directional antennas such that the frequency assignment pattern of FIG. 1 would result in reduced co-channel interference.

The frequency rotation described with reference to the first preferred embodiment is rotated frequency assignment where the angle of rotation is related to the number of sectors such that the frequency or group of frequencies associated with one sector are rotated fully into another sector. In the case of the tri-sectored cells, the frequency assignment is rotated by 120° clockwise or anti-clockwise. Other types of rotation could be used for example where the orientation of the sectors at the base station is rotated by different angles, for example 60° in a tri-sectored arrangement.

Sector rotation increases capacity in an FWA system where the subscribers have directional antennas by increasing the distance to interfering sectors. This then enables robust link margins to be achieved at smaller frequency re-use factors $N_b$ than would otherwise be possible with a regular arrangement of cells as conventionally used in mobile cellular network planning. The reduction of the frequency re-use factor enables more transceivers to be allocated to each base, with a consequent increase in base station capacity.

Rotation of sectors improves link performance by reducing the amount of interference experienced from nearby re-use or first tier cells by moving them into the side lobe rather than the main lobe of the subscriber antenna. This rotation process causes the effective frequency re-use distance of interference received within the main lobe to be increased, with a consequent increase in the link C/I.

The tessellating cluster arrangement of FIGS. 1 and 2 also incorporates horizontal and vertical polarisation (referenced V or H) to reduce second and higher order tier interference. While vertical and horizontal polarisation are preferred, any orthogonal polarisation difference could alternatively be used, for example +/−45 degrees, or right hand circular and left hand circular polarisation of the carrier frequencies.

Referring to the tessellating cluster of four sector frequency patterns A, B, C and D of FIG. 2, a sector polarisation pattern is overlaid for each sector direction. Taking a first sector frequency pattern A, the sectors of frequency pattern B having subscribers which point toward the base stations of corresponding sectors in frequency pattern A are arranged to have a polarisation orthogonal to those of the corresponding sectors in frequency pattern A. Thus frequency group 1 in cell Bx is horizontally polarised whereas frequency group 1 in cell Ax is vertically polarised. This ensures that subscribers in sector 1 (frequency group 1) of Bx, many of which will have antennas directed toward sector 1 of Ax, will not "see" the base station of Ax and hence there will be no co-channel interference between these two sectors. Similarly sectors 2 of Ay and By, and sectors 3 of Az and Bz are orthogonally polarised with respect to each other to reduce co-channel interference between these sectors.

Sector frequency patterns B and C similarly have an overlaid sector polarisation pattern with respect to frequency pattern A. Thus for example sectors 2 in Ax and Cx, and sectors 3 in Ax and Dx are orthogonally polarised with respect to each other. The overlaid sector polarisation patterns reduces second and higher tier co-channel interference in a network to which the tessellating cluster is applied. Taking sector 2 of Ax for example, it can be seen that there is only one second tier interferer at sector 2 in Bx which has the same polarisation. Potential co-channel interferers at sectors 2 in Cx and Dx have orthogonal polarisation and are therefore substantially eliminated as interferers.

The sector frequency patterns A, B, C, and D overlaid with the directional sector polarisation patterns AB, AC, and AD shown in FIG. 2 provide the tessellating cluster of cells which repeat across the network of FIG. 1.

While the combination of frequency rotation or assignment and orthogonal polarisation according to the invention has been described with reference to the specific frequency and polarisation assignment arrangement of FIGS. 1 and 2, different combinations of frequency rotation and polarisation could also be used to reduce or eliminate first, second and higher tier interferers The formation of a tessellating cluster according to the first embodiment of the invention can be generalised to maintaining a sector frequency pattern (analogous to A) and repeating this within the tessellating cluster then for each repeated sector frequency pattern within the cluster, orthogonally polarising frequencies in sectors having subscribers directed toward base stations in the first sector frequency pattern with respect to corresponding sectors in the first sector frequency pattern. This provides a tessellating cluster of cells which reduces co-channel interference by frequency rotation within the sector frequency patterns and by overlaying sector polarisation patterns within the tessellating cluster.

A frequency could also be repeated in more than one sector in a cell of each sector frequency pattern, however for each repeated sector frequency pattern, sectors having subscribers directed towards the base station of the first sector frequency pattern would have orthogonal polarisation maintained with respect to the particular co-frequency sector at which these subscribers were looking.

The combination of frequency rotation and orthogonal polarisation in each tessellating cluster reduces the level of co-channel interference across the network, thereby providing an improvement in call quality—improved C/I. This allows a lower frequency re-use factor Nb to be used (such as 1 in the example of FIG. 1) for the same C/I level. Given the limited frequency spectrum available to the network, this increases the capacity of the network either in terms of subscriber call numbers or bandwidth The invention also allows improved C/I for the same base re-use factor which is advantageous in for example high level modulation systems where it is desirable to reduce co-frequency interference (including third and fourth tier) to a minimum.

The invention is particularly effective in wide band FWA applications which typically operate at frequencies in the order of 28 GHz. At these frequencies, line of site (LOS) propagation is required as such high frequency signals are less prone to the refraction around objects or reflection off objects which occur at lower frequencies such as the 2 GHz mobile cellular bands. LOS propagation reduces the likelihood of cross polar mixing which might occur during signal refraction or reflection, and this improves the effectiveness of the orthogonal polarisation used in the invention.

The invention is also effective at lower frequency bands, particularly where low powers are used in the system leading to largely LOS propagation.

First and second tier interference is typically high in LOS propagation environments (due to $r^2$ and not $r^{3.5}$ fall off) and prior art sector frequency allocation methods consequently suffer from poor call quality (low C/I) and/or low system capacity.

The arrangement of FIG. 1 may be further improved in some circumstances by imposing the layout of cells onto a city or town such that some cells introducing second tier interference (for example sector 2 of Bx into sector 2 of Ax in FIG. 2) may be omitted when the town or city size and shape allows.

While the invention has been described with reference to arrangements of tri-sectored cells, other cell sectorisation could also be used such as quad or hex sectored cells.

FIG. 3 shows tessellating clusters utilising frequency rotation and polarisation according to the invention in a network of quad-sectored cells. In the quad-sectored tessellating cluster there are four sector frequency patterns E, F, G, and H each comprising four quad-sectored cells m, n, o and p. Looking at sector frequency pattern E, and taking cell m as the base line cell, cells n, o and p have had sector rotation with respect to cell m by respectively 90, 180 and 270 degrees anti-clockwise. This sector frequency pattern E of rotated cells is repeated in the other sector frequency patterns F, G, and H of the tessellating cluster.

Figure 4:
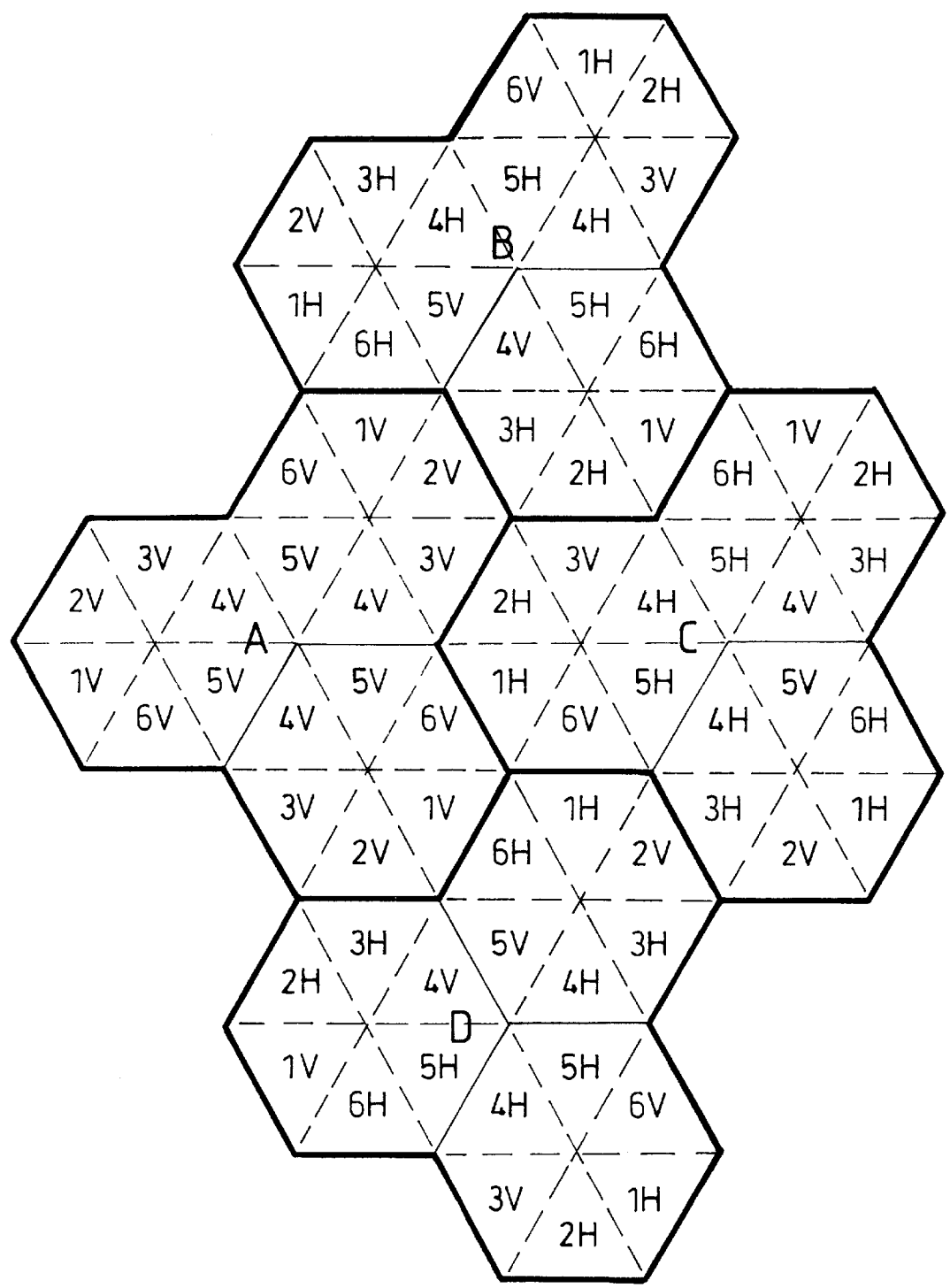
FIG. 4 is a schematic diagram of a hex-sectored cellular network in accordance with a third embodiment of the invention.

In a quad-sectored network an effective tessellating cluster can be achieved by overlaying a sector frequency pattern in which all the sectors in a sector frequency pattern (E, F, G, H) are of the same polarisation. In the example of FIG. 4, sector frequency patterns E and G are vertically polarised whereas sector frequency patterns F and H are horizontally polarised.

As in the previous embodiment, sector rotation reduces first tier co-channel interference in the directional FWA subscriber environment and the overlaid polarisation pattern reduces second and higher tier co-channel interference. For example there will be some subscribers in sector 1 of cells Fm and Fn which are directed toward the base stations of cells Em and En, however second tier co-channel interference is reduced because of the orthogonal polarisation difference between these cells.

FIG. 4 shows a tessellating cluster of hex-sectored cells. In this particular example, two cells in each frequency group A, B, C and D are rotated by two sectors with respect to the remaining non-rotated cell. The arrangement is therefore similar to the tri-sectored arrangement of FIGS. 1 and 2 in that three cells are required for each frequency pattern A or B or C or D. Similarly an orthogonal polarisation pattern is laid over the frequency patterns B, C, and D such that frequencies in sectors having subscribers directed toward base stations in the first sector frequency pattern A are orthogonally polarised with respect to corresponding sectors in the first sector frequency pattern A.

FIG. 5 shows an arrangement of a number of networks of FIG. 1 which are joined to further reduce co-channel interference for some cells. The arrangement for tri-sectored cells enables three rows of sectors to have no first or second tier interference at all, thereby further improving the link C/I for some base stations. The figure shows three lines of base stations for only one frequency group (1); lines of base stations with no second tier interferers for the other two frequency groups in the arrangement can be chosen independently. The further improvement provided by this arrangement can be significant since in practical deployments the technique could be used to ensure that a very high proportion of the total base stations in a city would have no first or second tier interferers.

The foregoing describes the invention including preferred forms thereof. Alterations and modifications as would be obvious to some one skilled in the art are intended to be incorporated within the scope hereof.

What is claimed is:

1. A method of operating a cellular communications network which serves directional subscribers, the method comprising the steps of:
    maintaining sectored cells in order to communicate wanted signals between a plurality of subscribers and base stations using a plurality of carrier frequencies;
    maintaining directional mis-alignment and polarization differences across the network between sectors carrying common frequencies in order to reduce co-frequency interference, wherein directional mis-alignment is maintained between sectors in first tier cells carrying common frequencies in order to reduce first tier co-frequency interference;
    and polarization differences are maintained between sectors in second and higher tier cells carrying common frequencies in order to reduce second and higher tier co-frequency interference.

2. A method as claimed in claim 1 further comprising the step of:
    maintaining the cells in tessellating clusters such that co-frequency interference is reduced substantially uniformly across the network.

3. A method as claimed in claim 2, wherein each said tessellating cluster comprises a number of repeating sector frequency patterns overlaid with a number of sector polarisation patterns.

4. A method as claimed in claim 3, wherein each said tessellating cluster comprises:
    a first sector frequency pattern comprising a number of cells and n repeated sector frequency patterns, wherein n is the number of sectors in each cell;
    and wherein for each repeated sector frequency pattern, frequencies in sectors having subscribers directed towards base stations in said first sector frequency pattern are orthogonally polarised with respect to corresponding sectors in said first pattern.

5. A method as claimed in claim 4, wherein said orthogonal polarisation difference is vertical and horizontal polarisation.

6. A cellular communications network which serves directional subscribers and comprises:
    a plurality of base stations arranged to form sectored cells using
    a plurality of carrier frequencies;
    wherein sectors carrying common frequencies are directionally mis-aligned and arranged such that the polarization of said frequencies are varied with respect to each other across the network in order to reduce co-frequency interference;
    sectors in first tier cells carrying common frequencies are directionally mis-aligned in order to reduce first tier co-frequency interference; and
    sectors in second and higher tier cells carrying common frequencies are arranged such that the polarization of said frequencies are varied with respect to each other in order to reduce second and higher tier co-frequency interference.

7. A network as claimed in claim 6 wherein the cells are arranged into tessellating clusters such that co-frequency interference is reduced substantially uniformly across the network.

8. A network as claimed in claim 7 each said tessellating cluster comprises a number of repeating sector frequency patterns overlaid with a number of sector polarisation patterns.

9. A network as claimed in claim 8, wherein each said tessellating cluster comprises:
    a first sector frequency pattern comprising a number of cells and n repeated sector frequency patterns, wherein n is the number of sectors in each cell;
    and wherein for each repeated sector frequency pattern, frequencies in sectors having subscribers directed towards base stations in said first sector frequency pattern are orthogonally polarised with respect to corresponding sectors in said first pattern.

10. A network as claimed in claim 9, wherein said orthogonal polarisation difference is vertical and horizontal polarisation.

* * * * *